Figure 1:
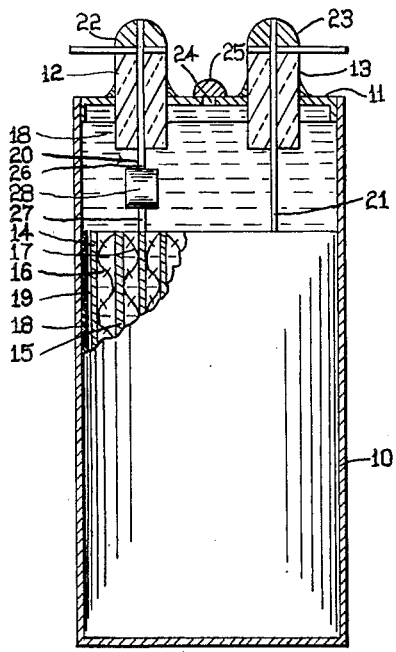

April 21, 1953

O. NESS ET AL 2,636,076

ELECTROLYTIC CAPACITOR

Filed Sept. 13, 1950

*INVENTORS*
ODVAR NESS & KERMIT N. LAMBERT
BY
*THEIR ATTORNEY*

Patented Apr. 21, 1953

2,636,076

UNITED STATES PATENT OFFICE 2,636,076

ELECTROLYTIC CAPACITOR

Odvar Ness, Williamstown, and Kermit N. Lambert, North Adams, Mass., assignors to Sprague Electric Company, a corporation of Massachusetts Application September 13, 1950, Serial No. 184,596

2 Claims. (Cl. 175—315)

The present invention relates to electrolytic capacitors and more particularly to an electrical terminal assembly for electrolytic capacitors and the like.

Electrolytic capacitors normally include electrolyte compositions which during use, and particularly when overheated and under high field strengths, may give off gases such as hydrogen, low molecular weight hydrocarbons and the like. Since it is necessary that electrolytic capacitors be sealed in order for them to be stable under various operating conditions, there is the ever present danger that the evolved gases will build up a pressure within the sealed unit sufficient to rupture or burst the housing. In the event that the capacitor housing does burst, fragments of the housing may cause considerable damage to people or surrounding apparatus. Because of this, electrolytic capacitors have usually been provided with venting means for allowing the safe discharge of gas and thereby keeping the gas pressure within the capacitor housing from becoming dangerously high.

Since electrolytes may be corrosive in nature and since a venting operation once completed leaves a permanent opening in the capacitor housing, electrolyte may leak out from the vented capacitor and corrode surrounding wiring or circuit elements.

It is an object of the present invention to overcome the foregoing and related disadvantages. Another object of this invention is to produce novel electrolytic capacitors and electrical terminal assemblies for electrolytic capacitors. These and other objects of the invention will become apparent from the description and claims that follow.

In accordance with the present invention an electrolytic capacitor is provided with a terminal lead assembly having two lengths of metal, joined together by a readily fusible alloy having a melting point below about 160° C., the joined assembly being inert or resistant to deterioration in the presence of the capacitor's electrolyte. It has been discovered that the generation of gas in an electrolytic capacitor is insignificant so long as the capacitor is operating at normal, that is relatively low, temperatures. At elevated temperatures however the danger of gas generation is appreciable. By providing a readily fusible lead connection, the capacitor will be automatically disconnected when its operating temperature rises unduly, and the danger of bursting is practically completely eliminated.

A joining alloy of two or more metals selected from the class consisting of lead, bismuth, cadmium, tin and indium and having a melting temperature between about 90° C. and 160° C. may be used for the purposes of the present invention. Alloys having a melting point between about 100° C. and 125° C. are preferred. Various alloys for use with this invention and their melting points are:

| | M. P. ° C. |
|---|---|
| 58% bismuth, 42% lead | 125 |
| 60% bismuth, 40% cadmium | 140 |
| 53% bismuth, 32% lead, 15% tin | 96 |
| 52% bismuth, 40% lead, 8% cadmium | 91.5 |
| 40% bismuth, 40% lead, 20% tin | 111 |
| 54% bismuth, 20% cadmium, 26% tin | 103 |
| 55.5% bismuth, 44.5% lead | 124 |

The percentages given above are all calculated by weight.

These metal alloys may or may not be eutectics. It has been found that aluminum or tantalum surfaces are inert to the capacitor's electrolyte and are accordingly highly suited for electrical leads. However, these metals are not wet by the above alloys and cannot be properly bonded together directly with it. Copper makes a very effective bonding surface if it is first coated with solder or tin, but the presence of exposed copper surfaces in contact with both electrolyte and aluminum which is usually used as the capacitor electrodes, causes the aluminum to rapidly corrode at the lead junction, apparently by electrolytic action.

According to the present invention, the desired fusible lead joint is provided with tinned copper coatings on the individual lead lengths, the tinning being arranged to entirely cover the copper. In spite of the difference in composition between the alloy and aluminum it has been discovered that such a joint is substantially inert to the electrolyte and shows no tendency to corrode even after several years of capacitor life.

The electrical terminal assembly of this invention acts as an internal temperature responsive fuse for the electrolytic capacitor of which it is a part. It is constructed so that it will carry heavy currents, melt at or slightly below the critical or excessive gassing temperature of the capacitor, be free of electrolytic deterioration in the presence of electrolyte, and have a contact resistance comparable to that of conventional welded or soldered metal lead connections. The melting of the alloy opens the capacitor circuit thereby preventing any further heat generation in the capacitor and avoiding explosion or housing ruptures due to overheating.

Figure 2:
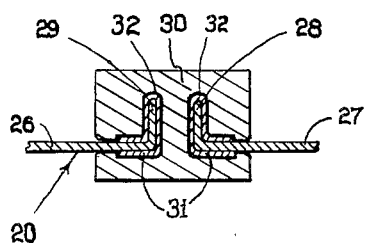

This invention will be more fully described with reference to the appended drawings wherein:

Fig. 1 shows a partial cross sectional view of an electrolytic capacitor in accordance with one embodiment of this invention, and Fig. 2 shows a detailed view of a terminal assembly of this invention.

The capacitor shown in Fig. 1 comprises an open-ended container 10 of terneplate, aluminum or the like sealed by a cover 11 through which protrudes dielectric terminal posts 12—13. Within the container is a capacitor section comprising convolutely wound foils 14 and 15 of aluminum, lead, tin, tantalum or the like. Interposed between the foils 14 and 15 are porous spacers 16 and 17 of kraft paper, linen paper or the like and impregnating the spacers 16 and 17 is an electrolyte 19 such as disclosed in U. S. P. 2,377,630, issued June 5, 1945, to J. L. Hyde, the electrolyte, as shown, preferably filling all voids in the wound assembly. An insulating paper sheath 18 surrounds the section and keeps it from touching the casing 10. Electrical connections to the electrode foils 14 and 15 are provided by tabs 20 and 21 respectively, said tabs passing through the terminal posts 12 and 13 and being soldered to the desired circuit leads as shown at 22 and 23 respectively. The tab 20 consists of two lengths 26—27 electrically connected by metal alloy plug 30. The capacitor may be impregnated through an aperture 24 of the cover 11 which is subsequently sealed by a solder fillet 25.

The terminal assembly (tab 20 of Fig. 1) is shown in detail in Fig. 2. The two-spaced lengths 26—27 of aluminum, for example, are shown as electrically connected at their ends 28, 29 by metal alloy plug 30. These ends are preferably coated with a film of copper 31 which is tinned as indicated at 32. For improved circuit-breaking action the ends are bent at right angles to the elements as shown and are completely enclosed within the metal alloy fuse element 30. Copper may be bonded to the aluminum electrode elements by fusing or welding copper bar stock to the aluminum and subsequently rolling down the fused or welded stock to a useful thickness. It may also be applied by initially providing an adherent zinc flash coat on the aluminum element and subsequently electroplating copper on the zinc layer. The copper coated portion of the aluminum elements may be tinned by dipping the copper coated portion of the elements into molten solder. One highly effective technique for applying a copper layer upon an aluminum surface is as follows:

1. Buff to remove any unevenness.
2. Clean with trichloroethylene to remove dirt, grease, etc.
3. Rinse in clean cold water.
4. Etch by dipping in a 5% solution of caustic soda in water at 90° C. for three minutes.
5. Rinse in cold water.
6. Dip in a 10% solution of nitric acid in water, at room temperature.
7. Dip for two to three minutes in a cold (20° C.) solution of 525 grams NaOH and 100 grams zinc oxide in a liter of water.
8. Rinse in cold water.
9. Electroplating the resulting zinc-coated aluminum with copper by any convenient process. This may be done by using the zinc-coated aluminum member as the cathode and a copper member as the anode of an electroplating cell having the following electrolyte:

5.5 ounces copper cyanide
    8.0 ounces Rochelle salts
    6.8 ounces sodium cyanide
    4.0 ounces sodium carbonate
    1 gallon water The above ingredients are mixed till the solution is complete. During plating the solution temperature should be kept at about 70 to 80° F., the interelectrode potential at 2 to 3 volts and the current density at 8 to 24 amperes/sq. ft. The thickness of the copper plate under these conditions is from 0.05 to 0.2 mil depending on the plating time.

The metal alloy joint of the present invention may be prepared in any suitable manner as by being cast, molded or soldered about the tinned ends of the terminal elements. Where soldering is used, the joined lead sections are generally brought into direct contact and it is desirable to place the joint under tension or flexing strain so that the sections will undergo positive separation upon fusion of the low-melting link.

Other types of capacitor sections such as stacked plates, and other electrolytes such as KOH solutions in water and gelled with carboxy methyl cellulose can also be used with the above type of joint to contribute the advantages of the invention. Tantalum and titanium can be used in place of the aluminum lead sections, using the same coating technique to reduce corrosion.

As many apparently widely different embodiments of this invention may be made without departing from the spirit and scope hereof, it is to be understood that it is not limited to the specific embodiments hereof except as defined in the appended claims.

What is claimed is:

1. An electrolytic capacitor which comprises a wound capacitance section, an electrolyte, an hermetically sealed housing encasing said capacitor section and said electrolyte, electrical terminal leads of opposite polarity extending from said capacitance section through said housing, said leads being insulated from said housing, one of said terminal leads being composed of two sections of a metal selected from the class consisting of aluminum and tantalum, the adjacent portions of said two sections being formed with short lengths of wire bent at right angles to the main direction of said wires, said short lengths being coated with a metal which is readily wetted by an alloy of two or more metals selected from the class consisting of lead, bismuth, cadmium tin, or indium, said bent lengths being encased in a block of an alloy of two or more metals selected from the class consisting of lead, bismuth, cadmium, tin, or indium, said alloy having a melting point between about 90 and 160° C. and being inert to deterioration in the presence of said electrolyte, said electrolyte being capable of the generation of gases at a rate which would break said housing at temperatures greater than about 160° C.

2. An electrolytic capacitor as defined in claim 1 wherein said individual lead lengths are covered with a tinned copper coating.

ODVAR NESS.
KERMIT N. LAMBERT.

References Cited in the file of this patent

UNITED STATES PATENTS

| Number | Name | Date |
| --- | --- | --- |
| 1,192,879 | Ferrell | Aug. 1, 1916 |
| 1,455,781 | Dubilier | May 22, 1923 |
| 1,769,837 | Hull | July 1, 1930 |
| 1,823,368 | Marbury | Sept. 15, 1931 |
| 2,216,558 | Ortlieb | Oct. 1, 1940 |
| 2,307,561 | Bailey | Jan. 5, 1943 |
| 2,327,511 | Lange | Aug. 24, 1943 |
| 2,445,769 | Fiore | July 27, 1948 |

FOREIGN PATENTS

| Number | Country | Date |
| --- | --- | --- |
| 595,853 | Great Britain | Dec. 18, 1947 |